United States Patent
Busaba et al.

(10) Patent No.: US 8,464,030 B2
(45) Date of Patent: Jun. 11, 2013

(54) INSTRUCTION CRACKING AND ISSUE SHORTENING BASED ON INSTRUCTION BASE FIELDS, INDEX FIELDS, OPERAND FIELDS, AND VARIOUS OTHER INSTRUCTION TEXT BITS

(75) Inventors: Fadi Busaba, Poughkeepsie, NY (US); Brian Curran, Saugerties, NY (US); Lee Eisen, Rounk Rock, TX (US); Bruce Giamei, Poughkeepsie, NY (US); David Hutton, Tallahassee, FL (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 12/757,330

(22) Filed: Apr. 9, 2010

(65) Prior Publication Data

US 2011/0252220 A1    Oct. 13, 2011

(51) Int. Cl.
 *G06F 7/38* (2006.01)
 *G06F 9/00* (2006.01)
 *G06F 9/44* (2006.01)
 *G06F 15/00* (2006.01)

(52) U.S. Cl.
 USPC ........................................................ 712/220

(58) Field of Classification Search
 USPC ........................................................ 712/213
 See application file for complete search history.

(56) References Cited

U.S. PATENT DOCUMENTS

| | | | |
|---|---|---|---|
| 4,604,684 A | 8/1986 | Epstein | |
| 4,853,840 A | 8/1989 | Shibuya | |
| 4,858,104 A | 8/1989 | Matsuo et al. | |
| 4,873,629 A | 10/1989 | Harris et al. | |
| 4,882,701 A * | 11/1989 | Ishii | 712/241 |
| 5,073,855 A | 12/1991 | Staplin et al. | |
| 5,150,468 A | 9/1992 | Staplin et al. | |
| 5,357,626 A * | 10/1994 | Johnson et al. | 714/33 |
| 5,434,985 A | 7/1995 | Emma et al. | |
| 5,500,947 A | 3/1996 | Uhler et al. | |

(Continued)

FOREIGN PATENT DOCUMENTS

| | | |
|---|---|---|
| EP | 378816 | 12/1989 |
| EP | 374830 A3 | 3/1992 |

(Continued)

OTHER PUBLICATIONS

Michael Gschwind and Kemal Ebcioglu and Erik Altman and Sumedh Sathaye. Binary Translation and Architecture Convergence Issues for IBM System/390. In Preceedings of ICS-2000 Sante Fe, New Mexico, Aug. 8-10, 2000.

(Continued)

*Primary Examiner* — Corey S Faherty
(74) *Attorney, Agent, or Firm* — Fleit Gibbon Gutman Bongini & Bianco PL; Thomas Grzesik

(57) ABSTRACT

A method, information processing system, and computer program product crack and/or shorten computer executable instructions. At least one instruction is received. The at least on instruction is analyzed. An instruction type associated with the at least one instruction is identified. At least one of a base field, an index field, one or more operands, and a mask field of the instruction are analyzed. At least one of the following is then performed: the at least one instruction is organized into a set of unit of operation; and the at least one instruction is shortened. The set of unit of operations is then executed.

19 Claims, 10 Drawing Sheets

U.S. PATENT DOCUMENTS

| | | | |
|---|---|---|---|
| 5,638,524 A * | 6/1997 | Kiuchi et al. | 712/221 |
| 5,666,506 A | 9/1997 | Hesson et al. | |
| 5,680,632 A * | 10/1997 | Studor et al. | 712/43 |
| 5,694,565 A | 12/1997 | Kahle et al. | |
| 5,717,910 A | 2/1998 | Henry | |
| 5,742,805 A | 4/1998 | Kulkarni et al. | |
| 5,752,273 A | 5/1998 | Nemirovsky et al. | |
| 5,781,752 A | 7/1998 | Moshovos et al. | |
| 5,802,373 A * | 9/1998 | Yates et al. | 717/139 |
| 5,826,089 A | 10/1998 | Ireton | |
| 5,867,684 A | 2/1999 | Kahle et al. | |
| 5,909,567 A | 6/1999 | Novak et al. | |
| 6,134,646 A | 10/2000 | Feiste et al. | |
| 6,219,742 B1 | 4/2001 | Stanley | |
| 6,223,254 B1 * | 4/2001 | Soni | 711/125 |
| 6,336,183 B1 | 1/2002 | Le et al. | |
| 6,654,869 B1 | 11/2003 | Kahle et al. | |
| 6,697,939 B1 | 2/2004 | Kahle | |
| 6,999,952 B1 | 2/2006 | Pham | |
| 7,024,545 B1 * | 4/2006 | Zuraski et al. | 712/240 |
| 7,082,517 B2 | 7/2006 | Busaba et al. | |
| 7,085,917 B2 | 8/2006 | Busaba et al. | |
| 7,159,102 B2 | 1/2007 | Irie et al. | |
| 7,162,621 B2 | 1/2007 | Kissell | |
| 7,257,807 B2 * | 8/2007 | Nikitin et al. | 717/152 |
| 7,269,715 B2 | 9/2007 | Le et al. | |
| 2002/0029332 A1 * | 3/2002 | Saulsbury | 712/225 |
| 2002/0152259 A1 | 10/2002 | Trong et al. | |
| 2004/0255099 A1 * | 12/2004 | Kromer | 712/219 |
| 2005/0223292 A1 | 10/2005 | Lee et al. | |
| 2006/0053343 A1 | 3/2006 | Hayem | |
| 2009/0182915 A1 * | 7/2009 | Farrell et al. | 710/104 |
| 2009/0210659 A1 | 8/2009 | Carlough et al. | |
| 2009/0240914 A1 | 9/2009 | Malley et al. | |
| 2009/0240919 A1 | 9/2009 | Alexander et al. | |
| 2010/0088493 A1 * | 4/2010 | Takahashi et al. | 712/221 |
| 2010/0306504 A1 * | 12/2010 | McDonald et al. | 712/208 |
| 2011/0161635 A1 * | 6/2011 | Gopal et al. | 712/220 |
| 2012/0030451 A1 * | 2/2012 | Pong et al. | 712/223 |

FOREIGN PATENT DOCUMENTS

| | | |
|---|---|---|
| JP | 2000259408 A | 9/2000 |
| JP | 2001229024 A2 | 8/2001 |
| JP | 2004342102 A2 | 12/2004 |

OTHER PUBLICATIONS

Gideon D, Intrater and Ilan Y. Spikkinger. Performance Evaluation of a Decoded Instruction Cache for Variable Instruction Length Computers. IEEE. Oct. 2004.

Flynn, Michael J., Instruction Sets and Their Implementations. IEEE., Dec. 27-29, 1990. EE Department, CSL. Stanford, CA.

Ziv, Abraham et al., Solving Range Constraints for Binary Floating Instructions. Jun. 15-18, 2003. Haifa University. International Business Machines Research Labs. Haifa, Israel.

Busaba, Fadi et al., The Design of the Fixed Point Unit for z990 Microprocessor. Apr. 26-28, 2004. GLSVLSI' 04. Boston, MA.

Quan, Gang et al., High Level Synthesis for Large Bit Width Multipliers on FPGAS: A Case Study. Sep. 19-21, 2005. Codes+ISSS' 05. New Jersey City, NJ.

Rizo-Morente, Jose et al.. Dynamic Current Modeling at the Instruction Level. Oct. 4-6, 2006. ISLPED' 06. Tegernsee, Germany.

* cited by examiner

R2=0 and M1=0

| Uop1: A NOP |
| No need to send it issue queue |

R2!=0 and M1=F

| Uop1: Unconditional Branch Uop |
|    : Always taken |
|    : branch target ← R2 |

R2!=0 and M1=1 to E

| Uop1: Unconditional Branch Uop |
|    : CC dependent for resolution |
|    : branch target ← R2 |

B2=0 or X2=0

```
Not cracked --LA/LAY
cracked - LAE/LAE
Uop1: 2-way Add
Uop2*: AR-R1 ← AR-base
```

FIG. 18

B2!=0 and X2!=0

```
Crack to 2 Uops (3 Uops for LAE/LAEY)
Uop1: sGR ← base-02
Uop2: Op: ← sGR-index
Uop3*: AR-R1 ← AR-base
```

RLL     $R_1,R_3\ D_2(B_2)$     [RSY]

| 'EB' | $R_1$ | $R_3$ | $B_2$ | $DL_2$ | $DH_2$ | '1D' |
|---|---|---|---|---|---|---|
| 0 | 8 | 12 | 16 | 20 | 32 | 40   47 |

RLLG     $R_1,R_3\ D_2(B_2)$     [RSY]

| 'EB' | $R_1$ | $R_3$ | $B_2$ | $DL_2$ | $DH_2$ | '1C' |
|---|---|---|---|---|---|---|
| 0 | 8 | 12 | 16 | 20 | 32 | 40   47 |

```
Not cracked
Uop1: target ← 1A-Immediate (EXRL)
     : target ← B2-X2-D2 (EX)
```

R1!=0

```
Crack to 2 Uops.
Uop1: target ← 1A-Immediate (EXRL)
     : target ← B2-X2-D2 (EX)
Uop2 : Read GPR-R1 (56 65)
```

INSTRUCTION CRACKING AND ISSUE SHORTENING BASED ON INSTRUCTION BASE FIELDS, INDEX FIELDS, OPERAND FIELDS, AND VARIOUS OTHER INSTRUCTION TEXT BITS

FIELD OF THE INVENTION

The present invention generally relates to microprocessors, and more particularly relates to managing variable length instructions.

BACKGROUND OF THE INVENTION

Various conventional approaches for increasing IPC (Instruction per cycle) crack instructions into a simpler set of unit of operations (Uops). However, although these approaches crack the instructions into Uops, the cracking is generally not directed towards efficient use of the issue queues, Therefore, the issues queues can suffer in performance and issue bandwidth.

SUMMARY OF THE INVENTION

In one embodiment, a method for one of cracking and shortening computer executable instructions is disclosed. The method comprises receiving at least one instruction. The at least on instruction is analyzed. An instruction type associated with the at least one instruction is identified based on the analyzing. At least one of a base field, an index field, one or more operands, and a mask field of the instruction are analyzed based on the instruction type that has been identified. At least one of the following is then performed: the at least one instruction is organized into a set of unit of operations based on the at least one of the base field, the index field, the one or more operands, and the mask field of the instruction that have been analyzed and the at least one instruction; and the at least one instruction is shortened based on the at least one of the base field, the index field, the one or more operands, and the mask field of the instruction that have been analyzed. The set of unit of operations is then executed.

In another embodiment, an information processing system for one of cracking and shortening computer executable instructions is disclosed. The information processing system comprising a memory and a processor communicatively coupled to the processor. The processor comprises an instruction decode unit. The instruction decode unit for receiving at least one instruction; analyzing the at least one instruction; and identifying, based on the analyzing, an instruction type associated with the at least one instruction. The instruction decode unit being further for analyzing, based on the instruction type that has been identified, at least one of a base field, an index field, one or more operands, and a mask field of the instruction. The processor further comprises a cracking unit and an instruction shortening unit. The processor for performing at least one of one organizing, via the cracking unit based on the at least one of the base field, the index field, the one or more operands, and the mask field of the instruction that have been analyzed, the at least one instruction into a set of unit of operations; and shortening, based on the at least one of the base field, the index field, the one or more operands, and the mask field of the instruction that have been analyzed, the at least one instruction. The processor being further for executing the set of unit of operations.

In yet another embodiment, a computer program product for one of cracking and shortening computer executable instructions is disclosed. The computer program product comprises a storage medium readable by a processing circuit and storing instructions for execution by the processing circuit for performing a method. The method comprises receiving at least one instruction. The at least one instruction is analyzed. An instruction type associated with the at least one instruction is identified based on the analyzing. At least one of a base field, an index field, one or more operands, and a mask field of the instruction are analyzed based on the instruction type that has been identified. At least one of the following is then performed: the at least one instruction is organized into a set of unit of operations based on the at least one of the base field, the index field, the one or more operands, and the mask field of the instruction that have been analyzed and the at least one instruction; and the at least one instruction is shortened based on the at least one of the base field, the index field, the one or more operands, and the mask field of the instruction that have been analyzed. The set of unit of operations is then executed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIGS. 18-19 show various examples of Uops created for the load address type instructions of FIGS. 14-17 according to one or more embodiments of the present invention;

FIGS. 20-21 show various examples of rotate/shift type instructions;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
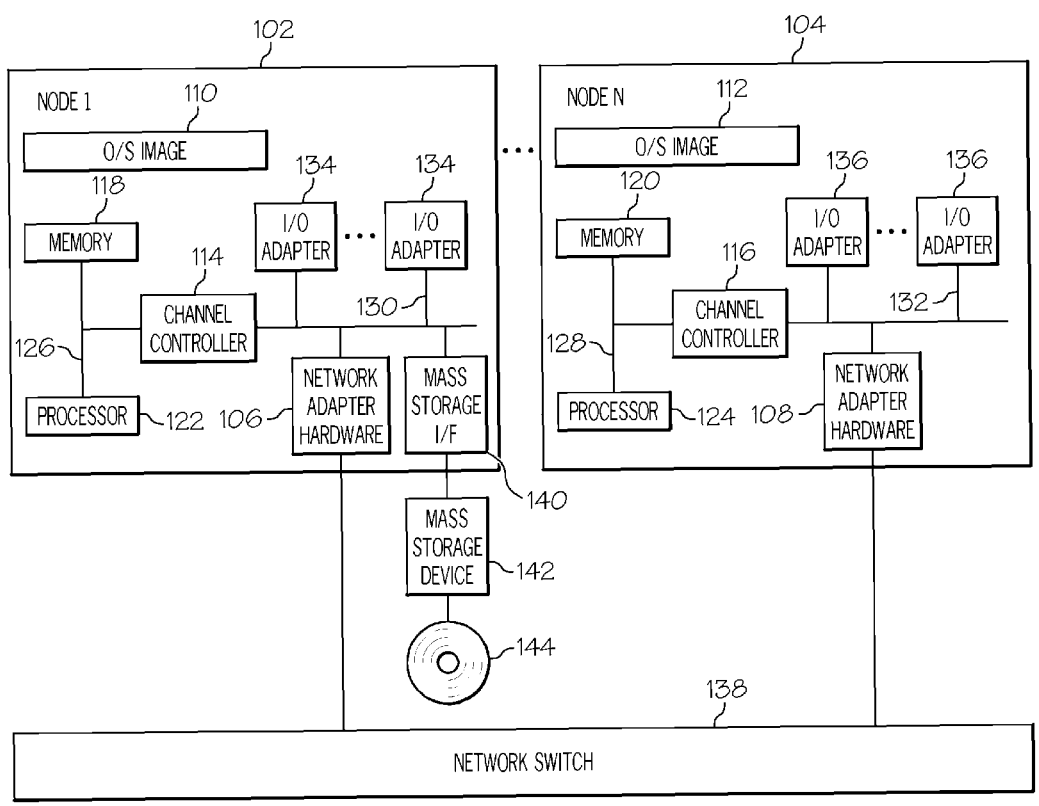
FIG. 1 illustrates one example of an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an Symmetric Multi-Processing (SMP) computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples Input/Output (I/O) adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc (CD) drive, which may be used to store data to and read data from a CD 144 or Digital Versatile Disc (DVD). Another type of data storage device is a hard disk configured to support, for example, Journaled File System (JFS) type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
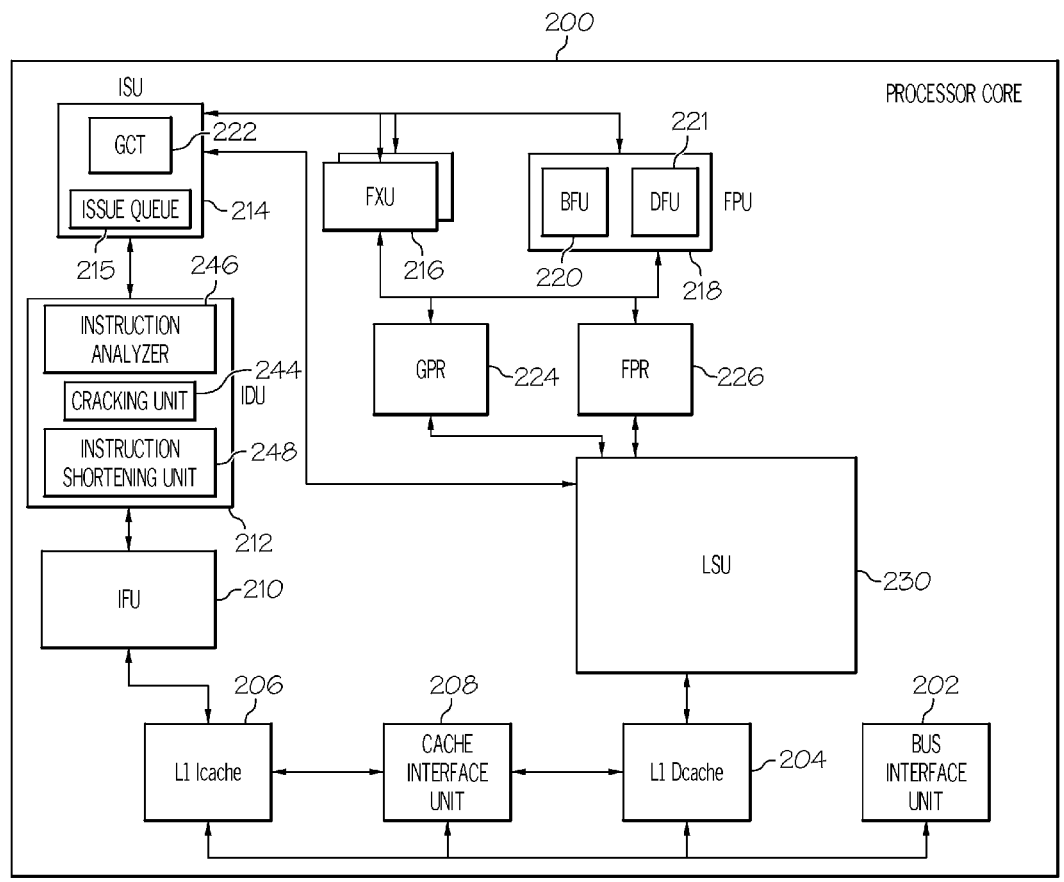
FIG. 2 illustrates a detailed view of a processing core according to one embodiment of the present invention.

According to one embodiment, FIG. 2 illustrates one example of a processor core 200 within a processor 122, 124 for cracking and shortening instructions based on the instruction type (opcode), instruction base field, instruction index field, instruction operands (R1 and R2) fields, and other instruction text fields. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an instruction decode unit (IDU) 212 into instruction processing data. Once decoded, the instructions are dispatched to an instruction sequencer unit (ISU) 214 and saved in the Issue Queue (IQ) 215. The ISU 214 controls sequencing of instructions issued to various execution units such as one or more fixed point units (FXU) 216 for executing general operations and one or more floating point units (FPU) 218 for executing floating point operations. The floating point unit(s) 218 can be a binary point floating unit 220, a decimal point floating unit 221, and/or the like. It should be noted that the FXU(s) 216, in one embodiment, comprises multiple FXU pipelines, which are copies of each other. The ISU 214 is also coupled to one or more load/store units (LSU) 230 via multiple LSU pipelines. These multiple LSU pipelines are treated as execution units for performing loads and stores and address generation for branches. Instruction stay in the issue queue waiting to be issued to the execution units depending on their age and on their dependencies. For example, instruction in the IQ are examined to determine their dependencies and to see whether they can be issued. Upon determining which instructions or Uops are ready for issue, the hardware selects the oldest instructions (Uops) among these instructions and then issues the selected instruction to execution units. The issue bandwidth depends on the number of execution available in the design.

A set of global completion tables (GCT) 222 residing within the ISU 214 track the instructions issued by ISU 214 via tags until the particular execution unit targeted by the instruction indicates the instructions have completed execution. The FXU 216 and FPU 218 are coupled to various resources such as general-purpose registers (GPR) 224 and floating point registers (FPR) 226. The GPR 224 and FPR 226 provide data value storage for data values loaded and stored from the L1 Dcache 204 by a load store unit (LSU) 230.

In one embodiment, the IDU 212 comprises a cracking unit 244. The cracking unit 244 organizes/breaks a complex instruction into simpler units. Stated differently, the cracking unit 244 organizes an instruction into a set of units of operation (Uops) that can be handled in parallel paths. The cracking unit 244 is discussed in greater detail below. In one embodiment, the IDU 212 also comprises an instruction shortening unit 248 that alters the execution of the instruction by, for example, reducing execution steps and/or execution pipes. The shortened instruction occupies less issue queue and GCT resources and improves the issue queue bandwidth. The instruction shortening unit 248 is discussed in greater detail below Instruction Cracking and Shortening As discussed above, a computer system typically comprises an instruction fetch part/unit, instruction decode unit instruction grouping and dispatching unit, instruction sequencing and issuing unit, execution units (Fixed Point, Load Store, Binary Floating Point Unit (BFU), Decimal Floating Point Unit, etc.) and instruction complete unit. Instruction decode refers to instructions being first decoded and understood. Information about the instruction's grouping, cracking, instruction characteristics such as load, store, and the like are decoded. At instruction dispatch (last in order point), information such as logical register number and type (GPR, FPR, AR, etc.), Condition Code read/write, Floating Point Control (FPC) read/write, Program Status Word (PSW) read/write, and the like is provided to the ISU.

The ISU maps the logical registers (e.g. GPR's and FPR's) specified by the instruction to physical copies that are used by execution units; sets dependency vectors among various instructions and cracked components (Uops) of instructions; and stores the dispatched instruction in an instruction queue. Instructions (or Uops) ready for issue are read from the instruction queue, ranked per execution unit and age, and then issued to execution units. For example, if two instructions are ready to issue to an FXU pipe0, only the oldest instruction is issued since each execution unit can only receive a single instruction.

Therefore, in addition to the general processing mechanisms discussed above with respect to FIG. 1, various embodiment of the present invention increase IPC (Instruction per cycle) by optimizing the rate of instruction processing and increasing the throughput of data. For example, issue queues sizes and instruction issue bandwidth are sensitive for performance. Therefore, various embodiments of the present invention save issue queue entries by altering the processing of the decoded instructions for a fixed size queue that meets cycle time requirements. This improves the overall performance of the issue queue. In addition, various embodiments change a Uop (unit of operation) issue from dual issue (i.e., a single Uop is issued twice, once to a LSU and once to an execution unit such as a FXU) to single issue (i.e., only issue to one execution unit). This saves issue bandwidth and improves performance by allowing younger Uops to be issued earlier.

In one embodiment, the IFU 210 fetches an instruction from the Icache 206 and sends the instruction into the pipeline for decoding by the IDU 212. The IDU 212 decodes the instruction and identifies the instruction type such as, but not limited to, an RR-type branch instruction (e.g., Branch on Count Register (BCTR), Branch on Count Grande Register (BCTGR), Branch on Condition Register (BCR), and Branch and Save Register (BASR), and Branch and Link Register (BALR)); Load Address (LA)); Load Address Yonder (LAY), Load Address Extended (LAE) LAE, and Load Address Extended Yonder (LAEY) type instructions; shift/rotate type instructions (e.g., Rotate Left single Logical (RLL) and Rotate Left single Logical Grande (RLLG)); and Load and Test Register (LTR) and Load and Test Grande Register (LTGR) type instructions. The instruction analyzer 246 in the IDU 212 analyzes the identified instruction to determine the base field, index field, R1 and R2 operand field values as well as various other selected instruction text bits. The instruction cracking and shortening units 244, 248 based on these identified values, crack and/or shorten the instructions, as is discussed in greater detail below.

Figure 3:
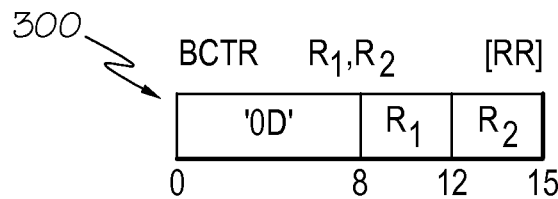
FIGS. 3-4 show various examples of branching type instructions.
Figure 4:
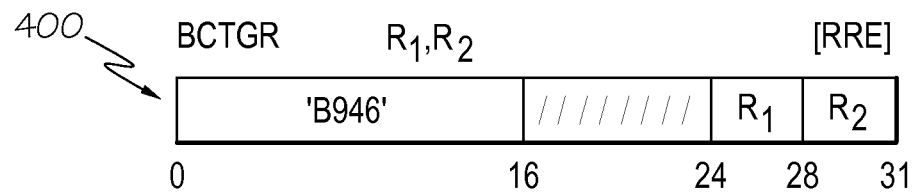

FIGS. 3-4 illustrate examples of Branch on Count (BCTR and BCTGR) instructions, respectively. As can be seen from FIG. 3, a BCTR instruction format 300 comprises a set of instruction text bits 0:7. These instruction text bits are the instruction opcode. Instruction text bits 8:11 comprise a first operand field R1. Instruction text bits 12:15 comprise a second operand field R2. As can be seen from FIG. 4, a BCTGR instruction format 400 comprises a set of instruction text bits 0:15. Instruction text bits 16:23 are undefined for a BCTGR instruction. Instruction text bits 24:27 comprise a first operand field R1. Instruction text bits 28:31 comprise a second operand field R2.

BCTR and BCTGR instructions are branch on count instructions. These instructions decrements one from operand R1 (GPR(R1)) and write the result back in GPR(R1). If the result of the decrement is not zero (i.e. GPR(R1)−1!=0) then the instruction branches to the address specified in operand R2 (contents of GPR(R2)). These instructions can also be used with the R2 field=0. This results in the instruction no longer being a branch instruction, it is more similar to a subtract instruction that does not change the condition code. Therefore, the instruction analyzer 246, in one embodiment, analyzes the R2 field at decode time to determine if the R2 field is 0. Instruction cracking/shortening is then performed based on this determination.

Figure 5:
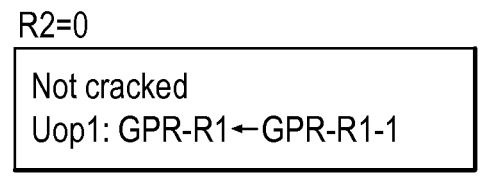
FIGS. 5-6 show various examples of Uops created for the branching type instructions of FIGS. 3-4 according to one or more embodiments of the present invention.
Figure 6:
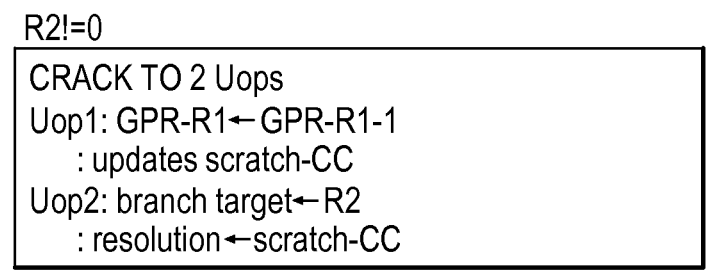

For example, FIGS. 5-6 show examples of cracking BCTR and BCTGR instructions based on the contents of the R2 field. In particular, FIG. 5 shows that if the instruction analyzer 246 determines that the R2 field is equal to 0 then there is just a single Uop. Cracking is not performed and the instruction just decrements GPR(R1) by value of 1. However, as shown in FIG. 6, if the instruction analyzer 246 determines that R2 does not equal 0 the instruction is cracked into two Uops since the instruction is a branch instruction.

Uop 1 performs a GPR(R1)−1 operation and places the result back into GPR(R1). This operation decrements the contents of the GPR for R1 by 1 and sets it to a scratch CC (condition code). The scratch CC is read by Uop2 to determine if R1−1=0. Uop2 reads the branch target address from GPR(R2). Uop2 then determines, based on the value in the scratch CC, whether GPR(R1)−1=0. If GPR(R1)−1 does not equal to zero, then the branch to the target address is taken, otherwise the branch is not taken.

Figures 7, 8, 9, 10:
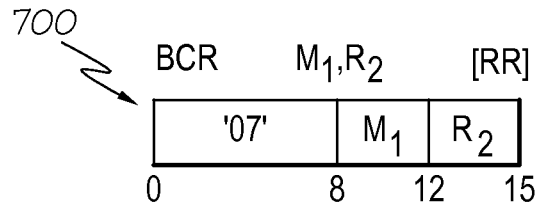
FIG. 7 shows another example of a branching type instruction.
FIGS. 9-10 show various examples of Uops created for the branching type instructions of FIG. 7 according to one or more embodiments of the present invention.

FIG. 7 illustrates an example of a Branch on Condition (BCR) instruction. As can be seen from FIG. 7, a BCR instruction format 700 comprises a set of instruction text bits 0:7. These instruction text bits are the instruction opcode. Instruction text bits 8:11 comprise a mask field M1. Instruction text bits 12:15 comprise an operand field R2. The M1 field is used as a four-bit mask. The four condition codes values (0, 1, 2, and 3) correspond, left to right, with the four bits of the mask. For example, A condition code value of 0 corresponds to M1 value of 8, and a condition code value of 1 corresponds to M1 value of 4. There can be multiple bits of the mask M1 set so to test more than one condition code value. The instruction branches to a new instruction targets when the CC value identified by the corresponding Mask bit equals to 1.

The following cases can occur with a BCR instruction: R2=0 or M1=0; R2!=0 and M1=F; and R2 !=0 and M1=1-E. With R2=0 or with M1=0, no operation is necessary. The issue queue does not need to be occupied. With R2 !=0 and M1=F, the instruction becomes an unconditional branch to a new instruction target. As a result, the BCR is not a condition code dependent operation. With R2!=0 and M1=1-E, a conditional branch is taken and this operation is condition code dependent.

In one embodiment, the instruction analyzer 246 analyzes the R2 and M1 fields of a BCR instruction. Based on the values of the R2 and M1 fields, the instruction shortening unit 248 shortens the BCR instruction. FIGS. 8-10 illustrate various examples of shortening a BCR instruction. As can be seen from FIG. 8, when the instruction analyzer 246 determines that R2=0 or M1=0, the instruction is not a branch instruction and no operation (NOP) is necessary. A BCR with R2=0 or with M1=0 is similar to an operation referred as a "no op" that can be used to separate code. Therefore, when R2=0 or when M1=0 in a BCR there are no execution requirements and the instruction does not need to be issued.

If the instruction analyzer 246 determines that R2!=0 and M1=F then the operations shown in FIG. 9 resembles an unconditional branch instruction. For example, if M1=F then the mask is "1111" and all conditions are tested for. Therefore, only a single Uop is required, which reads the branch target location from R2 and performs the branch to this location.

If the instruction analyzer 246 determines that R2!=0 and M1 is between 1 and E (1110) then the operations shown in FIG. 10 are taken. Therefore, only a single Uop that is similar to a conditional branch is required. This Uop reads the CC and the branch may or may not be taken (i.e. branch resolution can be taken or not) depending on the CC value. If the CC value identified by the corresponding Mask bit equals to 1, then the instruction branches to a new target specified by the contents of GPR(R2).

In the above, example, the instruction can be shortened in two ways. For the case of R2=0 or M1=0, the instruction is not issued so an issue queue entry is saved and issue bandwidth is improved for not issuing the instruction. The second example of instruction shortening is for the case when R2!=0 and M1=F. In this case, the instruction is made not to be dependent on the CC, thus, allowing the instruction to have a chance to be issued earlier than the case when it is CC dependent. Issue bandwidth is improved by having more instructions issued in one cycle to the execution units. Instructions that are dependent on each other cannot be generally issued together since the result from one instruction is required for the execution of the other. By removing CC dependency, the BCR can then be issued with other CC updating instructions.

Figure 11:
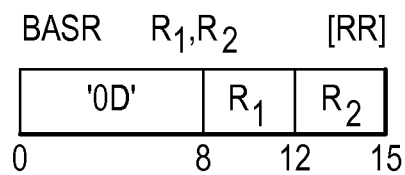
FIGS. 11-12 show additional examples of branching type instructions.
Figure 12:
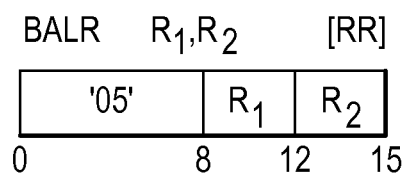

FIGS. 11 and 12 illustrate examples of Branch and Save (BASR) and Branch and Link (BALR) instructions, respectively. As can be seen from FIG. 11, a BASR instruction format 1100 comprises a set of instruction text bits 0:7. These instruction text bits are the instruction opcode. Instruction text bits 8:11 comprise a first operand field R1. Instruction text bits 12:15 comprise a second operand field R2. As can be seen from FIG. 12, a BALR instruction format 1200 comprises a set of instruction text bits 0:7. These instruction text bits are the instruction opcode. Instruction text bits 8:11 comprise a first operand field R1. Instruction text bits 12:15 comprise a second operand field R2.

These instructions branch to a new target and save the current updated instruction address (IA) in the GPR of R1. If the R2=0 then these instructions no longer branch. However the instructions still perform the updated IA saving operation in the GPR of R1. In other words, the BASR and BALR instructions have two operands R1 and R2. These instructions save the current IA into R1. R2 includes the target of the branch. If R2=0 then there is not a branch. However, software uses this R2=0 scenario to save the instruction IA of the instruction following branch in a particular GPR.

Figure 13:
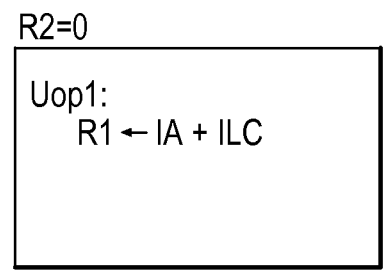
FIG. 13 show an example of Uops created for the branching type instructions of FIGS. 11-12 according to one or more embodiments of the present invention.

Conventionally, the BASR and BALR instructions are normally cracked into 3 Uops. One of these Uops is used for the branching and the other two Uops are used for the IA saving operation. One or more embodiment of the present invention, on the other hand, utilizes the instruction analyzer 246 to determine when R2=0. As discussed above, when R2=0 these instructions are no longer branch instructions. Therefore, the cracking and instruction shortening units 244, 248 crack and shorten the instruction, respectively. For example, the instructions are only cracked into 2 Uops (as compared to 3 Uops) with the branching Uop removed, as shown in FIG. 13. The instructions BASR and BALR are cracked to 2 Uops when R2 !=0. Uop 1: branch target GPR(R2). Uop2: GPR (R1). IA+ILC, where IA is the instruction address for the BASR/BALR instruction and ILC is the length of the instruction in bytes. These instructions are no longer cracked when R2=0, and the instructions only do the GPR(R1). update. Since the instructions are non-branching instructions when R2=0 only the executing part of the instructions, namely the IA+ILC (instruction length) and save back into R1, are required.

It should be noted that the discussion above with respect to BASR and BALR instructions also applies to instructions such as Brand and Set Mode (BAS) and Branch and Save And Set Mode (BASSM) instructions. BSM/BASSM instructions also save the existing addressing mode and branch to a new addressing modes. Addressing modes is 2 bits in PSW (Program Status word) that specifies the addressing modes used for instruction fetching, operand accesses (loads or stores) and other address related function. Address mode can be either 24-bit, 31-bits and 64-bits addressing modes. If R2=0, then these ops no longer branch nor set addressing mode. Therefore instruction decoded shorten the instruction by removing the Uop(s) that performs the branches and setting the address modes.

Figure 14:
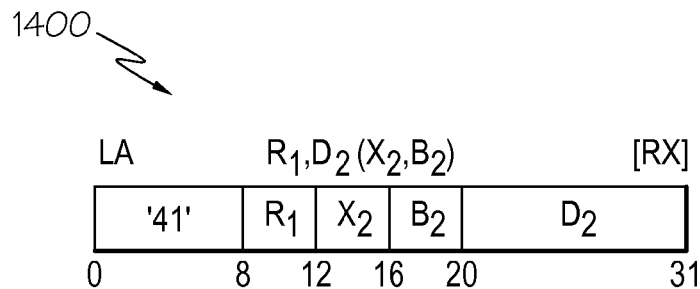
FIGS. 14-17 show various examples of load address type instructions.
Figure 15:
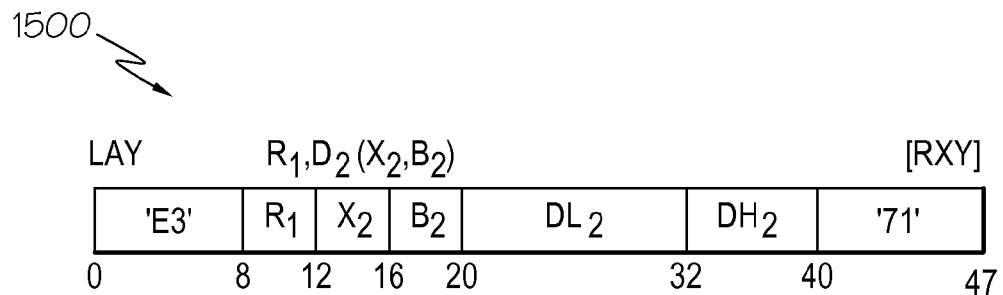
Figure 16:
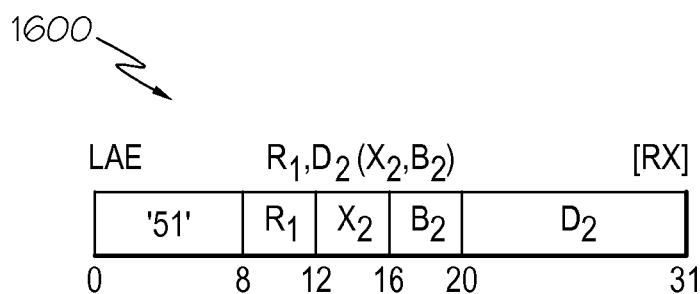
Figure 17:
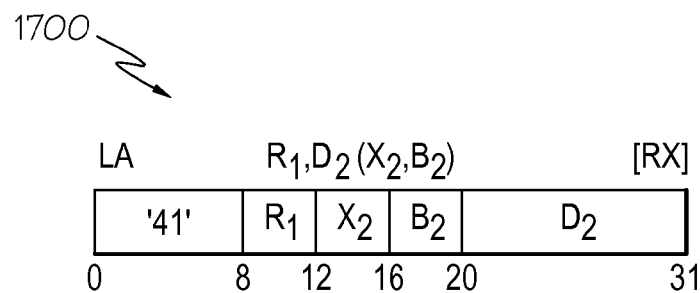

Another type of instruction is a load address instruction. FIGS. 14-17 illustrate various examples of load address instructions. In particular, FIG. 14 illustrates a load address (LA) instruction format 1400. FIG. 15 illustrates another load address (with long displacement) (LAY) instruction format 1500. FIG. 16 illustrates a load address extended (LAE) instruction format 1600. FIG. 17 illustrates another load address extended (with long displacement) (LAEY) instruction format 1700.

As can be seen from FIGS. 14 and 16, an LA instruction format 1400 and an LAE instruction formation comprise three operands, R1, B2 and X2, and a displacement field D2. These formats 1400, 1600 comprises a set of instruction text bits 0:7. These instruction text bits are the instruction opcode. Instruction text bits 8:11 comprise a first operand field R1 (contents of a GR). Instruction text bits 12:15 comprise a second operand field X2 (contents of index register). Instruction text bits 16:19 comprise a third operand field B2 (contents of base register). Instruction text bits 20:31 comprise the displacement field D2.

As can be seen from FIGS. 15 and 17, an LAY instruction format 1500 and an LAEY instruction format 1700 comprise a set of instruction text bits 0:7 and 40:47. These instruction text bits are the instruction opcode. Instruction text bits 8:11 comprise a first operand field R1(contents of a GR). Instruction text bits 12:15 comprise a second operand field X2(contents of an index register). Instruction text bits 16:19 comprise a third operand field B2(contents of a base register). Instruction text bits 20:31 and 32:39 comprise the displacement field DL2 (displacement low) and DH2 (displacement high).

These instructions add GPR(B2)+GPR(X2)+D2 and place the result back into GPR(R1). This operation is a 3-way add. An FXU can generally only perform a two way add. Therefore, conventional methods crack these instruction into 2 Uops. A first Uop1 performs the addition of B2+X2 and second Uop does the addition of D2. If X2=0 or if B2=0 then the contents of GR are not added, a 0 is added instead. If B2=0 then X2 and D2 are added. If B2=0 and X2=0 then D2 is stored in the GR.

In many performance critical cases sometimes either B2=0 or X2=0. In these situations, a 3-way is not required, but only a 2-way add is required. By having a 2-way add an LA or LAY instruction does not have to be cracked and can be issued or dispatched as a single operation. For example, the instruction analyzer 246 analyzes the instruction and determines that B2=0 or X2=0. Therefore, as shown in FIG. 18, an LA or LAY instruction is not cracked and is issued or dispatched as a single operation. However, an LAE/LAEY instruction is more complex. The cracking unit 244 cracks an LAE/LAEY instruction into two Uops. Uop1 is a 2-way add operation resembling an LA instruction when B2=0 or X2=0. Uop2 reads an AR (address register) from the base register and place the contents of the AR into R1. Uop2 comprises a "*" to indicate that this Uop is only needed for an LAE/LAEY instruction.

When the instruction analyzer 246 analyzes an LA/LAY or an LAE/LAEY instruction and determines that B2 and X2 !=0 then the LA/LAY or LAE/LAEY instruction needs to perform a 3-way add operation. Therefore, the cracking unit 244 cracks the LA/LAY instruction into 2 Uops and cracks an LAE/LAEY instruction into 3 Uops, as shown in FIG. 19. Uop1 takes GPR(B2)+D2 and stores the result in a scratch GR, where D2 is equal to the displacement field of the instruction. Uop2 reads the value from the scratch GR and adds this value to GPR(X2). Uop 1 and Uop2 are needed for an LA/LAY instruction and an LAE/LAEY instruction. Uop3, which is only needed for an LAE/LAEY instruction, reads an AR (address register) from the base register and place the contents of the AR into R1. It should be noted that although FIG. 19 shows that Uop1 adds GPR(B2)+D2, any combination of the operands can be used.

Another type of instruction is a shift/rotate instruction such as RLL and RLLG instruction. FIGS. 20-21 illustrate RLL and RLLG instruction formats, respectively. As can be seen from FIGS. 20-21, an RLL instruction format 2000 and an RLLG instruction format 2100 comprise a set of instruction text bits 0:7 and 40:47. These instruction text bits are the instruction opcode. Instruction text bits 8:11 comprise a first operand field R1(contents of a GR). Instruction text bits 12:15 comprise a second operand field R3 (contents of a GR). Instruction text bits 16:19 comprise a third operand field B2(contents of a base register). Instruction text bits 20:31 and 32:39 comprise the displacement field DL2 (displacement low) and DH2 (displacement high).

To begin, the instruction types such as shift, rotate and executed do not use the base field and do not use an operand to access cache memory. More specifically, Shift and rotate instructions have the shift amount specified in the lowest 6 bits of the addition of Base register and displacement fields (GPR(B2)+D2). In previous in-order implementations, the execution cycle (FXU shift/rotate) was after the AGEN (address generation) cycle and cache return. AGEN cycle is the cycle to calculate the address of the operands (Base+Index+displacement). In an out-of-order design where the execution unit is in parallel with AGEN cycle, the instruction is dual issued, where the first issue does the AGEN calculation and forms the rotate amounts and other controls needed to do the shift/rotate. The second issue, which is dependent on the results of the first issue, does the actual shift.

In one embodiment, the instruction analyzer 246 analyzes the B2 field during decoding to determine if B2=0 or another value. Depending on this value the instruction is either single issued or dual issued. For example, if B2!=0 the rotate/shift instruction is dual issued. In dual issued, the instruction is not cracked and it only occupies one entry in the issue queue. The first issue is an LSU issue. The LSU 230 performs the AGEN operation (GPR(B2)+D2). The lowest 6 bits of the AGEN result is used as the shift/rotate amount. The second issue is an FXU issue that is dependent on the LSU issue.

If B2=0, the contents of GPR-B2 is not used in the AGEN calculation and zeros are used instead. The rotate/shift amount can then be determined from the least significant bits of the displacement (instruction text bits 26:31). As a result, the instructions are single issued to the FXU 216 and the LSU issue is removed.

This above examples apply to all instructions that require AGEN functions. The AGEN issue can be bypassed when Base and Index fields are zeros for RX (Register-and-Indexed-Storage) type formats or when Base field is zero for RS (Register-and-Storage) formats. Example test data class ops are TCEB, TCDB, TCXB, TDCET, TDCDT, TDCXT, and the like. The dual vs. single issue is applied to all address generation usages when cache is not accessed. Examples are test data class BFU/DFU ops such as TCEB, SLDT, and the like.

Figures 22, 23, 24:
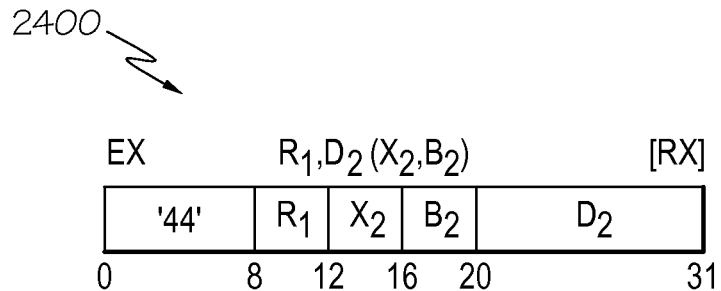
FIG. 22 show an example of an execute type instruction.
FIGS. 23-24 show various examples of Uops created for the execute type instructions of FIG. 22 according to one or more embodiments of the present invention.

Another instruction type is the Execute instructions (EX/EXRL). FIG. 22 shows an example of the EX instruction format 2200. As can be seen from FIG. 22, an EX instruction format 2200 comprises a set of instruction text bits 0:7. These instruction text bits are the instruction opcode. Instruction text bits 8:11 comprise a first operand field R1. Instruction text bits 12:15 comprise a second operand field X2. Instruction bits 16:19 comprise a third operand R2. Instruction text bits 20:31 comprise the displacement field D2.

The EX instruction as shown in FIG. 22 fetches the single instruction at the second-operand address (GPR(B2)+GPR(X2)+D2), and modifies it by the contents of general register R1, and the resulting instruction, referred to as the target instruction, is executed. The instruction executed is referred to as the subject of the execute.

The instruction analyzer 246 analyzes the R1 field at decode time to determine if R1=0. If R1=0 the EX/EXRL instructions are not cracked and are dispatched as a single Uop, as shown in FIG. 23. This single Uop determines the target where the Ifetch operation will occur. Therefore, the Uop either performs GPR(B2)+GPR(X2)+D2 for an EX instruction or performs IA+I2 for an EXRL (execute relative) instruction to determine the target location.

If the instruction analyzer 246 determines that R1!=0 then the EX/EXRL instruction is cracked into 2 Uops, as shown in FIG. 24. Uop21 is the same as discussed above, Uop1 either performs GPR(B2)+GPR(X2)+D2 for an EX instruction or performs IA+I2 for an EXRL (execute relative) instruction to determine the target location where the subject of Execute instruction is fetched. Uop2 reads GPR−R1. The lower 8 bits of the data (e.g., 56:63) is logically ORed with the instruction being fetched in Uop1 and the result instruction is then decoded and dispatched.

Figure 25:
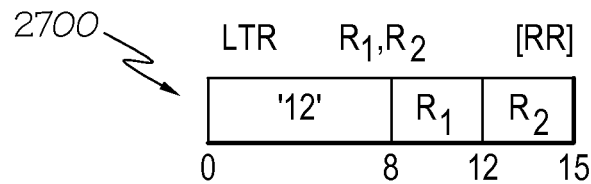
FIGS. 25-26 show various examples of load test type instructions.
Figure 26:
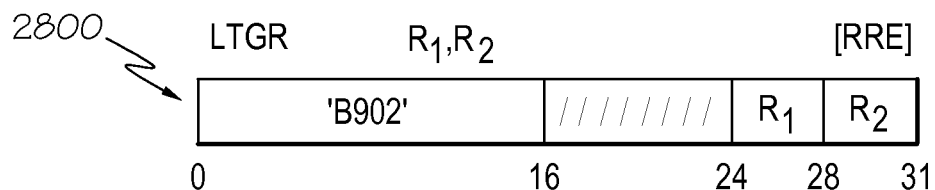

Another type of instruction is a load and test instruction such as LTR and LTGR. FIGS. 25-26 illustrate examples of an LTR and LTGR instructions, respectively. As can be seen from FIG. 25, an LTR instruction format 2500 comprises a set of instruction text bits 0:7. These instruction text bits are the instruction opcode. Instruction text bits 8:11 comprise a first operand field R1. Instruction text bits 12:15 comprise a second operand field R2. As can be seen from FIG. 26, an LTGR instruction format 2600 comprises a set of instruction text bits 0:15. Instruction text bits 16:23 are undefined. Instruction text bits 24:27 comprise a first operand field R1. Instruction text bits 28:31 comprise a second operand field R2.

Figure 27:
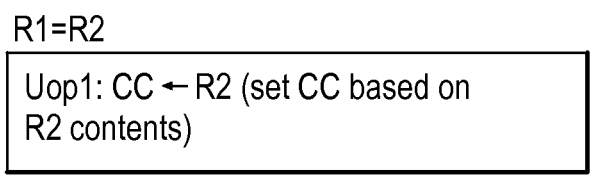
FIGS. 27-28 show various examples of Uops created for the load test type instructions of FIGS. 25-26 according to one or more embodiments of the present invention.
Figure 28:
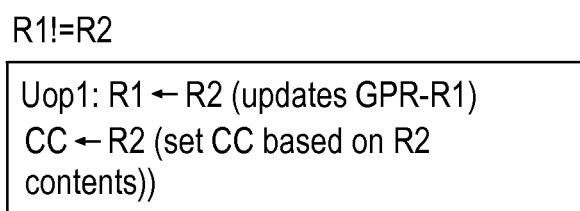

The instruction analyzer 246, in one embodiment, compares the R1 and R2 operands of an LTR/LTGR. Based on this comparison, the instruction shortening unit 248 shortens the instruction by removing the load component from the instruction. For example, when the instruction analyzer 246 determines that R1=R2 (i.e., the instruction is similar to a test instruction) the Uop only sets the CC based on the contents of R2, as shown in FIG. 27. The operation of identifying this instruction as writing a GR is removed. Also, any dependency that may have been created if a younger instruction wants to read that GR is also removed. If R1!=R2 then the Uop moves R2 into R1, e.g., updates GPR(R1), and sets the CC based on the contents of R2, as shown in FIG. 28.

Operational Flow Diagram

Figure 29:
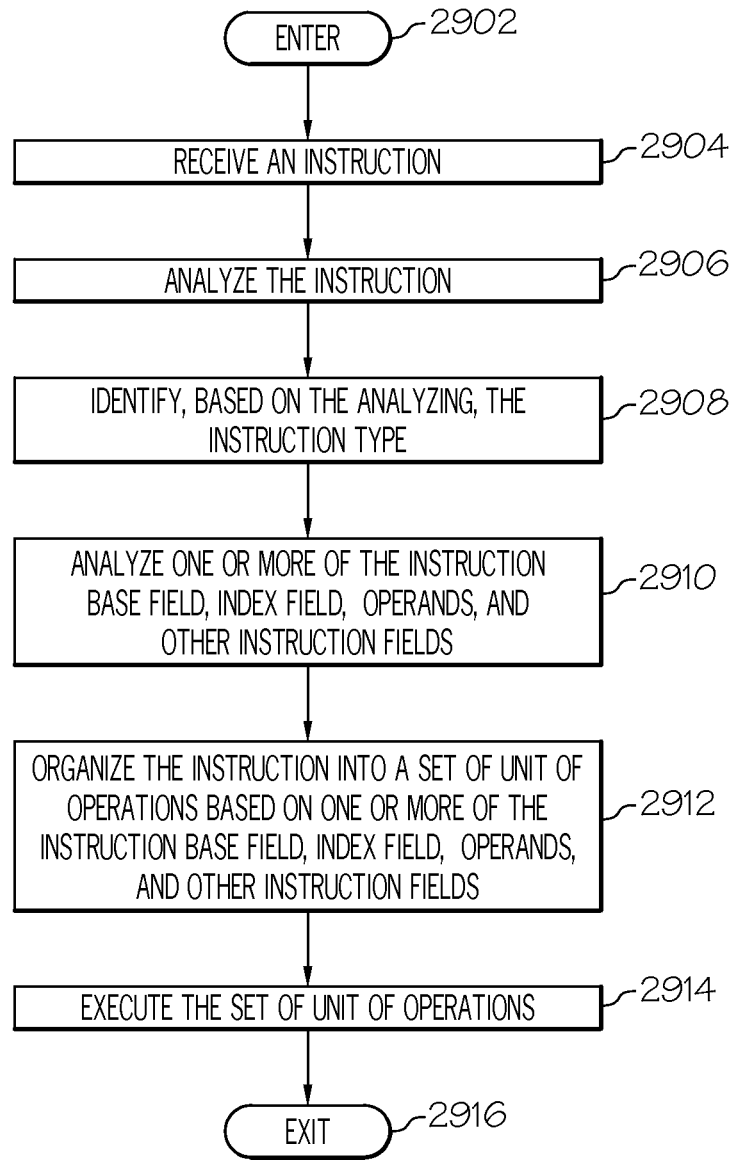
FIG. 29 is an operational flow diagram illustrating one examples of cracking and/or shortening an instruction based on its instruction type and at least one of a base field, an index field, one or more operands, and other instruction test bits according to one or more embodiments of the present invention.

FIG. 29 is an operational flow diagram illustrating one example of cracking and/or shortening instructions. The operational flow diagram of FIG. 29 begins at step 2902 and flows directly into step 2904. The IDU 214, at step 2904, receives an instruction. The IDU 214, via the instruction analyzer 246, at step 2906, analyzes the instruction. The IDU 214, at step 2908, determines the instruction type, (e.g., BCTR, BCTGR, BCR, BASR, BALR, LA, LAY, LAE, LAEY, EX, EXRL, LT, LTGR, shift/rotates instructions, and the like) based on the analyzing.

The IDU 214, via the instruction analyzer 246, at step 2910, also analyzes one or more of the instruction base field, index field, operands, and other instruction fields such as, but not limited to a mask field. These fields and their analysis have been discussed above in greater detail with respect to FIGS. 3-28. The cracking unit 244 and/or the instruction shortening unit 248, at step 2912, then organize the instruction into a set of unit of operations and/or shorten the instruction, respectively, based on the identified instruction type and values of the instruction base field, index field, operands, and/or other instruction fields. This cracking and shortening of an instruction has been discussed above in greater detail with respect to FIGS. 3-28. The IDU 214, at step 2914, executes the set of unit of operations. The control flow then exits at step 2916.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

The invention claimed is:

1. A method for one of cracking and shortening computer executable instructions, the method comprising:
   receiving at least one instruction;
   analyzing the at least one instruction;
   identifying, based on the analyzing, an instruction type, from a plurality of instruction types, associated with the at least one instruction;
   determining which set of instruction fields from a plurality of instruction fields to select from the at least one instruction based on the identified instruction type, wherein a different set of instruction fields is to be selected for at least two of the plurality of instruction types;
   selecting, based on the determining and during at least one instruction decoding cycle, the a set of instruction fields from the at least one instruction wherein the selected set of instruction fields comprises one or more of a base field, an index field, one or more operands, and a mask field;
   identifying, during at least one instruction decoding cycle, a current state of each of the selected instruction field;
   selecting, during at least one instruction decoding cycle, at least one a plurality of actions to perform on the at least one instruction based on the identified current state of each of the selected set of instruction fields, wherein the at least one action comprises at least one of:
      organizing the at least one instruction into a set of unit of operations; and
      shortening the at least one instruction, wherein the shortening comprises one of
         reducing a number of unit of operations in the set of unit of operations that the at least one instruction is organized into, and
         sending the at least one instruction to an instruction sequencer unit as a single unit of operation;
   performing, during at least one instruction decoding cycle, the selected action;
   sending one of the set of unit of operations and the shortened at least one instruction to the instruction sequencer unit; and
   executing, after the sending, one of the set of unit of operations and the shortened at least one instruction by one or more execution units.

2. The method of claim 1, wherein the instruction type that has been identified is one of:
   a branch instruction type;
   a load address instruction type;
   an instruction type not using a base field and not using an operand to access cache memory.

3. The method of claim 2, wherein the instruction type not using the base field and not using an operand to access cache memory is one of:
   a shift instruction type;
   a rotate instruction type; and
   an executed instruction type.

4. The method of claim 1, wherein organizing the at least one instruction into a set of unit of operations further comprises:
   determining that the instruction type is a branch instruction type; and
   organizing the at least one instruction into at least one of only a first unit of operation and both the first unit of operation and a second unit of operation based on the instruction type being a branch instruction type and a value of the second operand, wherein the first unit of operation decrements a value of a first operand of the instruction and sets a scratch condition code to the value, and wherein the second unit of operation reads a branch target address from the second operand and determines if the value of the first operand is equal to 0, wherein when the value of the first operand is equal to 0 the second unit of operation branches to the branch target address.

5. The method of claim 1, wherein shortening the at least one instruction is based on:
   identifying that the instruction type is a branch instruction type;
   determining that a first operand of the instruction is equal to a given value; and
   determining that a mask field of the instruction is equal to a given value.

6. The method of claim 1, wherein shortening the at least one instruction further comprises:

removing a branching unit of operation from the set of unit of operations based on:
    identifying that the instruction type is a branch instruction type;
    analyzing a first operand and a second operand of the instruction;
    determining, based on analyzing the first operand and the second operation, that the second operand is equal to 0.

7. The method of claim 1, wherein shortening the at least one instruction further comprises:
    removing an adding operation from the instruction, wherein removing the adding operation creates a two-way add operation, based on:
        identifying that the instruction type is a load address instruction type;
        analyzing at least one of the base field and the index field of the instruction;
        determining, based on analyzing at least one of the base field and the index field of the instruction, that at least one of the base field and the index field is equal to 0.

8. The method of claim 1, wherein organizing the at least one instruction into a set of unit of operations further comprises:
    organizing the at least one instruction into a first unit of operation and at least a second unit of operation based on:
        identifying that the instruction type is a load address instruction type;
        analyzing the base field and the index field of the instruction;
        determining, based on analyzing the base field and the index field of the instruction, that the base field and the index field are not equal to 0,
    wherein the first unit of operation performs an operation that adds the value of the base field to an immediate address value of the instruction and stores a value of the operation into a scratch register,
    wherein the at least second unit of operation reads the value stored in the scratch register and adds this value to the index field, and
    wherein when at least one of the base field and the index field are 0, the instruction is organized into at least one less unit of operation than when the base field and the index field are not equal to 0.

9. The method of claim 1, wherein organizing the at least one instruction into a set of unit of operations is based on:
    identifying that the instruction type is one of a rotate instruction type and a shift instruction type;
    analyzing the base field of the instruction; and
    determining, based on analyzing the base field, that the base field is not equal to 0.

10. The method of claim 1, wherein shortening the at least one instruction further comprises:
    preventing a unit of operation in the set of unit of operations from being issued based on:
        identifying that the instruction type is one of a rotate instruction type and a shift instruction type;
        analyzing the base field of the instruction; and
        determining, based on analyzing the base field, that the base field is equal to 0.

11. The method of claim 1, wherein shortening the at least one instruction further comprises:
    issuing the instruction as a single unit of operation based on:
        identifying that the instruction type is an execute instruction type;
        analyzing an operand field of the instruction; and
        determining, based on analyzing the operand field, that the operand field is equal to 0.

12. The method of claim 1, wherein shortening the at least one instruction further comprises:
    removing a load unit of operation from the set of unit of operations based on:
        identifying that the instruction type is a load test instruction type;
        comparing a first operand of the instruction to a second operand of the instruction; and
        determining, based on the comparing, that the first operand is equal to the second operand.

13. An information processing system for one of cracking and shortening computer executable instructions, the information processing system comprising:
    a memory;
    a processor communicatively coupled to the memory, wherein the processor comprises at least:
    a cracking unit;
    an instruction shortening unit; and
    an instruction decode unit capable of performing:
        receiving at least one instruction;
        analyzing the at least one instruction;
        identifying, based on the analyzing, an instruction type, from a plurality of instruction types, associated with the at least one instruction;
        determining which set of instruction fields from a plurality of instruction fields to select from the at least one instruction based on the identified instruction type, wherein a different set of instruction fields is to be selected for at least two of the plurality of instruction types;
        selecting, based on the determining and during at least one instruction decoding cycle, the a set of instruction fields from the at least one instruction wherein the selected set of instruction fields comprises one or more of a base field, an index field, one or more operands, and a mask field;
        identifying, during at least one instruction decoding cycle, a current state of each of the selected instruction field;
        selecting, during at least one instruction decoding cycle, at least one action to be performed on the at least one instruction based on the identified current state of each of the selected set of instruction fields, wherein the at least one action comprises at least one of one:
            organizing, via the cracking unit, the at least one instruction into a set of unit of operations; and
            shortening, via the instruction shortening unit, the at least one instruction, wherein the shortening comprises one of
                reducing a number of unit of operations in the set of unit of operations that the at least one instruction is organized into, and
                sending the at least one instruction to an instruction sequencer unit as a single unit of operation;
    wherein the processor performs the at least one selected action during at last one instruction decoding cycle;
    wherein the processor is further for executing one of the set of unit of operations and the shortened at least one instruction.

14. The information processing system of claim 13, wherein organizing the at least one instruction into a set of unit of operations further comprises:
    organizing the at least one instruction into a first unit of operation and a second unit of operation based on identifying that the instruction type is a branch instruction type and determining that a second operand of the instruction is not equal to 0, wherein the first unit of operation decrements a value of a first operand of the instruction and sets a scratch condition code to the value, and wherein the second unit of operation reads a branch target address from the second operand and determines if the value of the first operand is equal to 0, wherein when the value of the first operand is equal to 0 the second unit of operation branches to the branch target address.

15. The information processing system of claim 13, wherein organizing the at least one instruction into a set of unit of operations further comprises:
   organizing the at least one instruction into a first unit of operation and at least a second unit of operation based on:
      identifying that the instruction type is a load address instruction type;
      analyzing the base field and the index field of the instruction;
      determining, based on analyzing the base field and the index field of the instruction, that the base field and the index field are not equal to 0,
   wherein the first unit of operation performs an operation that adds the value of the base field to an immediate address value of the instruction and stores a value of the operation into a scratch register, and
   wherein the at least second unit of operation reads the value stored in the scratch register and adds this value to the index field.

16. A computer program product for one of cracking and shortening computer executable instructions, the computer program product comprising:
   a non-transitory storage medium readable by a processing circuit and storing instructions for execution by the processing circuit for performing a method comprising:
      receiving at least one instruction;
      analyzing the at least one instruction;
      identifying, based on the analyzing, an instruction type, from a plurality of instruction types, associated with the at least one instruction;
      determining which set of instruction fields from a plurality of instruction fields to select from the at least one instruction based on the identified instruction type, wherein a different set of instruction fields is to be selected for at least two of the plurality of instruction types;
      selecting, based on the determining and during at least one instruction decoding cycle, the a set of instruction fields from the at least one instruction wherein the selected set of instruction fields comprises one or more of a base field, an index field, one or more operands, and a mask field:
      identifying, during at least one instruction decoding cycle, a current state of each of the selected instruction field;
      selecting, during at least one instruction decoding cycle, at least one a plurality of actions to perform on the at least one instruction based on the identified current state of each of the selected set of instruction fields, wherein the at least one action comprises at least one of:
         organizing the at least one instruction into a set of unit of operations; and
         shortening the at least one instruction, wherein the shortening comprises one of
            reducing a number of unit of operations in the set of unit of operations that the at least one instruction is organized into, and
            sending the at least one instruction to an instruction sequencer unit as a single unit of operation;
      performing, during at least one instruction decoding cycle, the selected action;
      sending one of the set of unit of operations and the shortened at least one instruction to the instruction sequencer unit; and
      executing, after the sending, one of the set of unit of operations and the shortened at least one instruction by one or more execution units.

17. The computer program product of claim 16, wherein organizing the at least one instruction into a set of unit of operations further comprises:
   determining that the instruction type is a branch instruction type; and
   organizing the at least one instruction into at least one of only a first unit of operation and both the first unit of operation and a second unit of operation based on the instruction type being a branch instruction type and a value of the second operand, wherein the first unit of operation decrements a value of a first operand of the instruction and sets a scratch condition code to the value, and wherein the second unit of operation reads a branch target address from the second operand and determines if the value of the first operand is equal to 0, wherein when the value of the first operand is equal to 0 the second unit of operation branches to the branch target address.

18. The computer program product of claim 16, wherein shortening the at least one instruction is based on:
   identifying that the instruction type is a branch instruction type;
   determining that a first operand of the instruction is equal to a given value; and
   determining that a mask field of the instruction is equal to a given value.

19. The computer program product of claim 16, wherein shortening the at least one instruction further comprises:
   removing a branching unit of operation from the set of unit of operations based on:
      identifying that the instruction type is a branch instruction type;
      analyzing a first operand and a second operand of the instruction;
      determining, based on analyzing the first operand and the second operation, that the second operand is equal to 0.

* * * * *